United States Patent [19]
Kim et al.

[11] Patent Number: 5,724,384
[45] Date of Patent: Mar. 3, 1998

[54] PN CODE SYNC DEVICE USING AN ADAPTIVE THRESHOLD

[75] Inventors: Je-Woo Kim, Suwon; Jong-Hyeon Park, Seoul, both of Rep. of Korea

[73] Assignee: SamSung Electronics Co., Ltd., Suwon, Rep. of Korea

[21] Appl. No.: 502,863

[22] Filed: Jul. 14, 1995

[30] Foreign Application Priority Data

Jul. 14, 1994 [KR] Rep. of Korea ............... 17001-1994

[51] Int. Cl.⁶ .................................................. H04B 1/69
[52] U.S. Cl. ............................................................ 375/208
[58] Field of Search .......................... 375/200, 206–210, 375/343, 346, 367

[56] References Cited

U.S. PATENT DOCUMENTS

| | | | |
|---|---|---|---|
| 4,203,071 | 5/1980 | Bowles et al. | 375/343 |
| 4,214,209 | 7/1980 | Baier et al. | 375/367 |
| 4,327,438 | 4/1982 | Baier et al. | 375/208 |
| 4,423,517 | 12/1983 | Danno et al. | 375/208 |
| 4,435,822 | 3/1984 | Spencer et al. | 375/206 |
| 4,530,103 | 7/1985 | Mosley et al. | 375/208 |
| 4,575,861 | 3/1986 | Levreault | 375/200 |
| 4,649,549 | 3/1987 | Halpern et al. | 380/32 |
| 4,672,629 | 6/1987 | Beier | 375/200 |
| 4,875,221 | 10/1989 | Mori | 375/208 |
| 4,933,953 | 6/1990 | Yagi | 375/200 |
| 5,003,552 | 3/1991 | Mower | 375/200 |
| 5,031,191 | 7/1991 | Hiramatsu | 375/200 |
| 5,105,437 | 4/1992 | Kingston | 375/206 |
| 5,111,478 | 5/1992 | McDonald | 375/200 |
| 5,166,952 | 11/1992 | Omurg et al. | 375/200 |
| 5,184,135 | 2/1993 | Paradise | 342/149 |
| 5,199,050 | 3/1993 | Linsky | 375/367 |
| 5,245,612 | 9/1993 | Kachi et al. | 370/324 |
| 5,280,538 | 1/1994 | Kataoka et al. | 375/200 |
| 5,361,276 | 11/1994 | Subramanian | 375/200 |
| 5,396,515 | 3/1995 | Dixon et al. | 375/208 |
| 5,400,359 | 3/1995 | Hikoso et al. | 375/202 |
| 5,477,195 | 12/1995 | Spiilker | 331/11 |
| 5,566,214 | 10/1996 | Kroeger et al. | 375/355 |
| 5,574,721 | 11/1996 | Magill | 370/342 |

Primary Examiner—Young T. Tse
Attorney, Agent, or Firm—Robert E. Bushnell, Esq.

[57] ABSTRACT

A pseudo-noise code synchronization device using an adaptive threshold in a spread spectrum receiver comprises a pseudo noise code generator, a first despread circuit, a first accumulator and dump circuit, a first squaring circuit, a first adder, a first square root-operating circuit, an adaptive threshold generator, a comparator, an initial synchronization controller, a code tracking controller, and a pseudo noise clock controller, thereby performing a stable pseudo noise code synchronization of a received spread spectrum signal by varying the threshold according to the variance of the received spread spectrum signal.

25 Claims, 3 Drawing Sheets

PN CODE SYNC DEVICE USING AN ADAPTIVE THRESHOLD

CROSS-REFERENCE TO RELATED APPLICATIONS

This application makes reference to, incorporates the same herein, and claims all benefits accruing under 35 U.S.C. §119 from an application for PN Code Syn Device Using An Adaptive Threshold earlier filed in the Korean Industrial Property Office on 14 Jul. 1994 and assigned Serial No. 17001/1994.

BACKGROUND OF THE INVENTION

1. Technical Field

The present invention relates to a receiver used in a spread spectrum communication system, and more particularly to a pseudo-noise code sync device for processing the synchronization of a received pseudo noise (hereinafter sometimes referred to as a "PN") code from a received spread spectrum signal and a reference pseudo noise code.

2. Background Art

Conventionally, narrow band modulation systems (such as for example, amplitude modulation, frequency modulation and binary phase shift keying) have been used in the field of data communication. With such systems, demodulation at the receiver can be achieved with a relatively small amount of circuitry. Such systems, however, are weak due to multipath fading and narrow band noise.

By contrast, in spread spectrum communication systems, a data spectrum is spread by a pseudo-noise code (hereinafter "PN code") at a transmitting side, while the pseudo noise code and the data are synchronized at a receiving side so that the adverse effects of multipath fading and narrow band noise can be reduced. Accordingly, spread spectrum communication systems have attracted increased attention as a promising technique for radio frequency transmission of binary data.

One example for such a spread spectrum communication system is disclosed in U.S. Pat. No. 5,400,359 entitled *Spread Spectrum Communication System And An Apparatus For Communication Utilizing This System* issued to Hikoso et al. on 21 Mar. 1995. In Hikoso et al. '359, a pseudo noise code is generated and multiplied by data to generate a multiplied result which is then subjected to binary phase shift key (BPSK) modulation. The pseudo noise code is also subjected to BPSK modulation, delayed by at least one chip of the pseudo noise code, combined with a modulated signal, converted into a radio frequency (RF) signal, and transmitted from an antenna. The transmitted spread spectrum signal is received at a receiving end where a complementary receiving method is provided. In essence, the spread spectrum communication involves the art of expanding the bandwidth of a signal, transmitting the expanded signal, and recovering the desired signal by remapping the received spread spectrum into the original information bandwidth. The purpose of spread spectrum techniques is to allow the system to deliver error-free information in a noisy signal environment.

In such a spread spectrum communication system however, since the spectrum of the information signal is spread by a pseudo noise code having a broader spectrum width, in order to correctly restore the information signal, it is necessary to synchronize the demodulation pseudo noise code generated at the receiving side with the modulation pseudo noise code generated at the transmitting side. Proper phase synchronization is typically achieved when the received spread spectrum signal is accurately timed in both its spreading pseudo noise code pattern position and its rate of chip generation. The phase synchronization process is accomplished in two stages, i.e., an initial synchronization process for finding a synchronous phase and a process for tracking the detected phase. Known techniques for attaining the initial synchronization depend upon both analog and digital sliding correlators, matched filters and other devices. Known tracking techniques include tau-dither tracking and delay lock tracking. Such a slider correlator as disclosed for example, in U.S. Pat. No. 4,423,517 for *Code Sequence Synchronization System For Spread Spectrum Communication Receiver* issued to Danno, U.S. Pat. No. 4,649,549 for *Apparatus For Synchronizing Linear PN Sequences* issued to Halpern et al., and U.S. Pat. No. 5,111,478 for *Method And Apparatus For Providing Signal Synchronization In A Spread Spectrum Communication System* issued to McDonald, is generally configured to continuously change the phase of a reference pseudo noise code by slightly shifting the frequency of a reference Pseudo noise clock with respect to a transmission pseudo noise code generating clock in order to find a synchronous phase. Instead of shifting the frequency, the code phase may be varied stepwisely such as one disclosed in U.S. Pat. No. 5,184,135 for *Phase Measurement Of Received Pseudonoise Sequence Using Digital Correlation* issued to Paradise. However, both cases require a long time until the synchronous phase is detected.

The use of matched filters as disclosed in U.S. Pat. No. 4,203,071 for *Pseudo-Random- Number-Code-Detection And Tracking System* issued to Bowles et al., U.S. Pat. No. 5,031,191 for *Spread Spectrum Signal Demodulation Circuit* issued to Hiramatsu et al., U.S. Pat. No. 5,166,952 for *Method And Apparatus For The Reception And Demodulation Of Spread Spectrum Radio Signals* issued to Omurg et al. is effective to decrease the time. However, the implementation of matched filters often requires expensive and complex circuitry.

Tracking technologies using tau-dither tracking and delay lock tracking schemes such as ones disclosed in U.S. Pat. No. 5,048,053 for *Detecting And Tracking Circuit For Component PN Codes* issued to Mower et al., and U.S. Pat. No. 5,105,437 for *Programmable Digital Acquisition And Tracking Controller* issued to Kingston et al., on the other hand, have also utilized costly RF components. Such synchronization tracking is usually performed by measuring the correlation at early and late times as is discussed in U.S. Pat. No. 4,672,629 for *Receiver For Bandspread Signals* issued to Beier, U.S. Pat. No. 5,199,050 for *Pseudorandom (PN) Signal Synchronization Circuit And Related Method* issued to Linsky, and forming a time discrimination function from such measurements to control the receiver's reference timing.

In these conventional spread spectrum receivers which may be constructed in a synchronous or asynchronous manner, initial synchronization and synchronization tracking are achieved however often through costly and complex circuitry. Moreover, we have observed that false alarm and false tracking have often triggered and the time required to establish initial synchronization has not effectively improved.

SUMMARY OF THE INVENTION

Accordingly, it is therefore an object of the present invention to provide a spread spectrum receiver comprising

3 a pseudo noise code sync device capable of preventing the generation of false alarm or false tracking.

It is another object of the present invention to provide a spread spectrum receiver comprising a pseudo noise code sync device capable of accurately establishing initial synchronization between a received pseudo noise code modulated in a received spread spectrum signal and a reference pseudo noise code by varying a threshold according to the variance of the received spread spectrum signal.

It is still another object of the present invention to provide a spread spectrum receiver comprising a pseudo noise code sync device capable of reducing the time required for an initial synchronization.

To achieve these and other objectives, the receiver comprising a pseudo noise code sync device according to the present invention includes a receiving unit for translating the spread spectrum signal into an in-phase (I-channel) signal and a quadrature-phase (Q-channel) signal; a pseudo noise code generator for generating a reference pseudo noise code sequence comprising an early pseudo noise code, a punctual pseudo noise code, and a late pseudo noise code; a correlator unit for correlating the in-phase (I-channel) signal and the quadrature-phase (Q-channel) signal with the reference pseudo noise code sequence to produce early, punctual, and late correlation signals comprising in-phase and quadrature-phase components; an adaptive threshold control unit for adaptively generating a variable threshold in response to the punctual pseudo noise code and the in-phase (I-channel) and quadrature-phase (Q-channel) signals; an adaptive threshold generator for taking correlations between the in-phase (I-channel) and quadrature-phase (Q-channel) signals and the punctual pseudo noise code to produce an adaptive threshold; a comparator for comparing the punctual correlation signals with the adaptive threshold to produce a resultant signal; a code acquisition control unit for acquiring the received pseudo-noise code sequence modulated in the spread spectrum signal by detecting initial synchronization between the received pseudo noise code sequence and the reference pseudo noise code sequence to produce a code detection control signal; a code tracking control unit for comparing the early and late correlation signals to produce a pseudo noise clock control signal so as to maintain the received pseudo noise code sequence and the reference pseudo noise code sequence in fine synchronism; and a pseudo noise clock control unit for generating a pseudo noise clock signal in response to the code detection control signal and the pseudo noise clock control signal so as to control generation of the reference pseudo noise code sequence and synchronization between the received pseudo noise code sequence and the reference pseudo noise code sequence.

To further achieve the above objectives, the present invention also contemplates on a novel adaptive threshold generator as comprising a delay unit for phase-delaying the punctual pseudo noise code by $\pi$ and $2\pi$ to produce a two-chip delay pseudo noise code and a four-chip delay pseudo noise code, respectively; a correlator unit comprising a plurality of serially connected despreader, accumulator & dump circuits, squaring circuits and square root circuits, for correlating the in-phase (I-channel) signal and the quadrature-phase (Q-channel) signal with the two-chip delay and the four-chip delay pseudo noise signals to produce an early signal and a late signal; a minimum value selector for selecting the less of the early and late signals to produce a minimum value; an adaptive threshold operating unit for generating the adaptive threshold based upon the minimum value and predetermined forgetting and weighting factors.

4

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
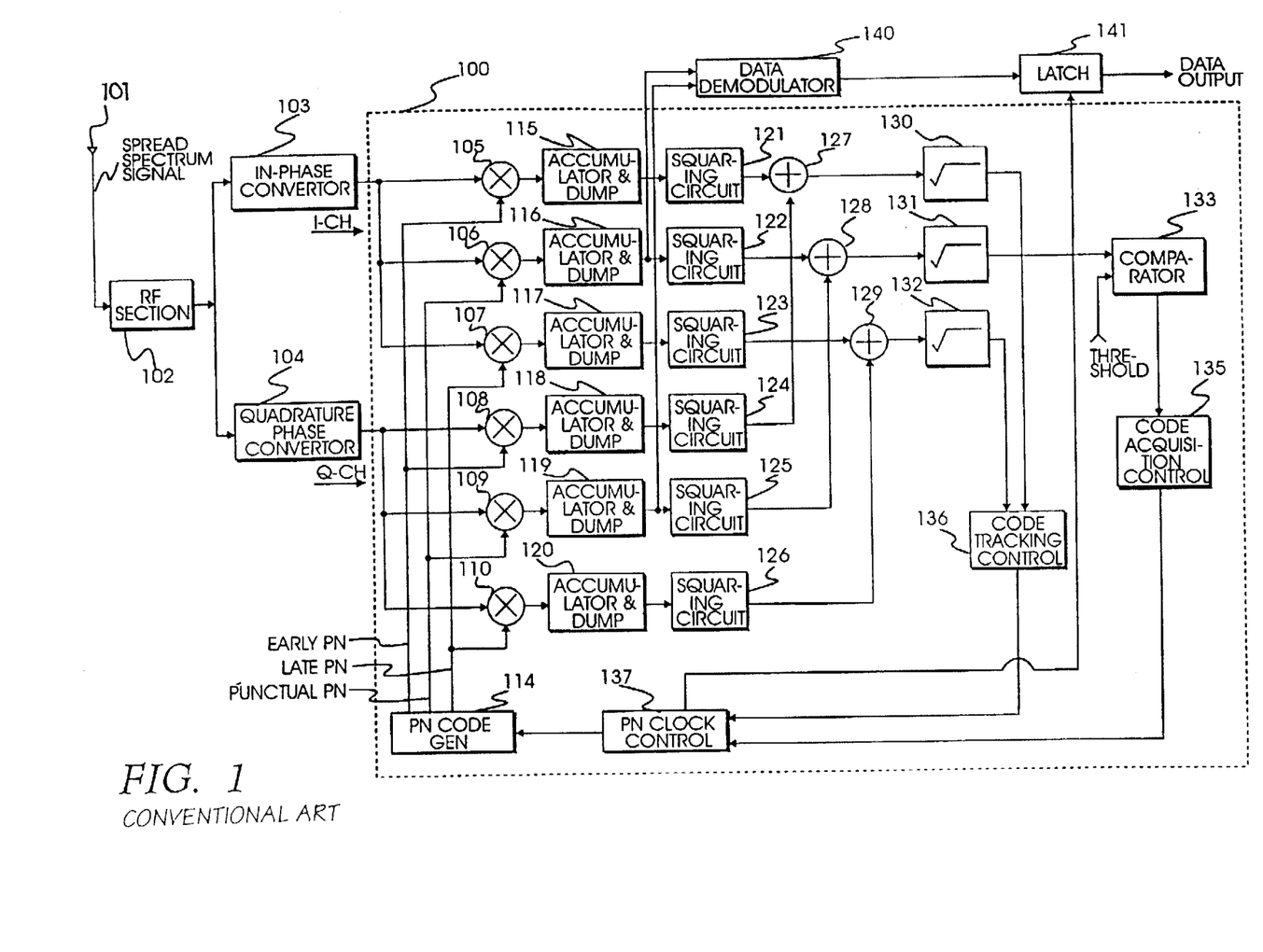
FIG. 1 is a block diagram showing the construction of a conventional spread spectrum receiver including a pseudo noise code sync device.

Referring to FIG. 1, a conventional receiver of the spread spectrum communication system is illustrated. Typically, the receiver includes an RF section 102 for receiving the spread spectrum signal having a pseudo noise code modulated therein via an antenna 101 and converting the received spread spectrum signal into an intermediate-frequency signal; an in-phase converter 103 and a quadrature-phase converter 104 for converting the intermediate-frequency signal into an in-phase (I-channel) spread signal and a quadrature-phase (Q-channel) spread signal; a pseudo noise code sync device 100 for despreading the received pseudo noise code modulated from the spread spectrum signal by synchronizing a reference pseudo noise code with the received pseudo noise code and maintaining the two codes in fine synchronism; a data demodulator 140 for demodulating the spread spectrum signal into the original baseband signal and a latch circuit 141 for synchronizing the demodulated signal with a pseudo noise clock signal generated from the pseudo noise code sync device 100.

The pseudo noise code sync device 100 as conventionally known in the art is generally constructed as shown in FIG. 1, and the initial sync and sync tracking process will now be described with reference to FIG. 1. The pseudo noise code sync device 100 comprises a pseudo noise code generator 114 which receives a pseudo noise clock and generates early, punctual and late pseudo noise codes, respectively. The punctual pseudo noise code is phase-delayed by ½ chip ($\pi/2$) as compared to the early pseudo noise code, and the late pseudo noise code is phase-delayed by ½ chip ($\pi/2$) as compared to the punctual pseudo noise code. That is, assuming that the punctual pseudo noise code is P(t) and 1 chip ($\pi$) duration is Tc, the early, punctual and late pseudo noise codes can be respectively indicated as follows:

$$\text{early pseudo noise code} = P\left(t + \frac{Tc}{2}\right) \quad (1)$$

$$\text{punctual pseudo noise code} = P(t) \quad (2)$$

$$\text{late pseudo noise code} = P\left(t - \frac{Tc}{2}\right). \quad (3)$$

First, second, and third despreaders 105, 106, 107 receive and multiply the I-channel spread signal by the early, punctual and late pseudo noise codes, respectively, so as to produce I-channel despread signals. Fourth, fifth, and sixth despreaders 108, 109, 110 receive and multiply the Q-channel spread signal by the early, punctual and late pseudo noise codes, respectively, so as to produce Q-channel despread signals. The I-channel and Q-channel spread signals used in the digital receiver are generally in the form of the digital signal.

First, second, third, fourth, fifth, and sixth accumulator and dump circuits 115, 116, 117, 118, 119, 120 receive the I-channel and Q-channel despread signals from the first, second, third, fourth, fifth, and sixth despreaders 105, 106, 107, 108, 109, 110, accumulate respective despread signals for 1 symbol duration, and then dump the results. First, second, third, fourth, fifth, and sixth squaring circuits 121, 122, 123, 124, 125, 126 respectively receive and square the output signals of the first, second, third, fourth, fifth and sixth accumulator & dump circuits 115, 116, 117, 118, 119, 120. An early adder 127 receives the output of the first squaring circuit 121 and the output of the fourth squaring circuit 124 and then adds these two signals; a punctual adder 128 receives the output of the second squaring circuit 122 and the output of the fifth squaring circuit 125 and then adds these two signals; a late adder 129 receives the output of the third squaring circuit 123 and the output of the sixth squaring circuit 126 and then adds these two signals.

First, second, and third square root circuits 130, 131, 132 receive the outputs of the first, second and third adders 127, 128, 129 and then output the square root-operated early, punctual and late signals, respectively.

In this case, the punctual signal is typically used for the code acquisition control and the early and late signals are used for the code tracking control. The initial synchronization is for synchronizing the received pseudo noise code with the reference pseudo noise code within 1 chip.

A comparator 133 compares the punctual signal of the second square root circuit 131 with a reference threshold and outputs a resultant signal indicating that an initial synchronization between the received pseudo noise code and the reference pseudo noise code has not been achieved if the punctual signal is less than the reference threshold. Thereafter, the code acquisition controller 135 receives the resultant signal and determines that the initial synchronization has not been achieved, so as to produce a code detection control signal. A pseudo noise clock controller 137 receives the code detection control signal and then outputs the pseudo noise clock delayed by 1 chip. The pseudo noise code generator 114 receives the pseudo noise clock and controls the speed of generating the reference pseudo noise code in response to the speed of the received pseudo noise clock. Thereafter, the above operations are repeatedly performed until the initial synchronization is achieved.

If, on the other hand, the initial synchronization has been achieved, the code tracking controller 136 receives the early and late signals and determines that the received pseudo noise code has been synchronized with the reference pseudo noise code within 1 chip. Then, the code tracking controller 136 synchronizes these two codes more accurately and performs a code tracking operation so as to maintain the two codes in fine synchronism within 1 chip. That is, if the early signal outputted from the first square root circuit 130 is greater than the late signal outputted from the third square root circuit 132, this means that the reference pseudo noise code is phase-delayed in comparison with the received pseudo noise code modulated in the spread spectrum signal; the code tracking controller 136 then controls the pseudo noise clock controller 137 to generate the pseudo noise clock fast in response thereto. Accordingly, the reference pseudo noise code is generated fast in order to be synchronized with the received pseudo noise code. On the contrary, however, if the late signal is greater than the early signal, this means that the received pseudo noise code modulated in the spread spectrum signal is phase-delayed in comparison with the reference pseudo noise code; the code tracking controller 136 then controls the pseudo noise clock controller 137 to generate the pseudo noise clock late in response thereto. Accordingly, the reference Pseudo noise code is generated late in order to be synchronized with the received pseudo noise code modulated in the spread spectrum signal.

Once the initial synchronization is achieved through the above described operations, a data demodulator as shown in FIG. 1 receives the I-channel punctual signal and Q-channel punctual signal outputted from the second and fifth accumulator and dump circuits 116 and 119 and then demodulates the base-band data. Known demodulation techniques such as for example BPSK, QPSK, DBPSK, DQPSK are generally used for demodulating spread spectrum data, and such a demodulating technique is determined according to the corresponding modulating technique employed in the transmitter part.

The above described pseudo noise code sync device detects whether or not the initial synchronization has been achieved by comparing the punctual signal with a predetermined threshold. While such conventional pseudo noise code sync device does establish initial synchronization between the received pseudo noise code modulated in the received spread spectrum signal and the reference pseudo noise code, we have observed and discovered that, due to the variance of the received spread spectrum signal, a false alarm has often occurred i.e., an indication that acquisition has occurred when the received pseudo noise code modulated in the received spread spectrum signal and the reference pseudo noise code are not in-phased i.e., misaligned which subsequently leads to a false tracking and deterioration in the performance of the system.

Figure 2:
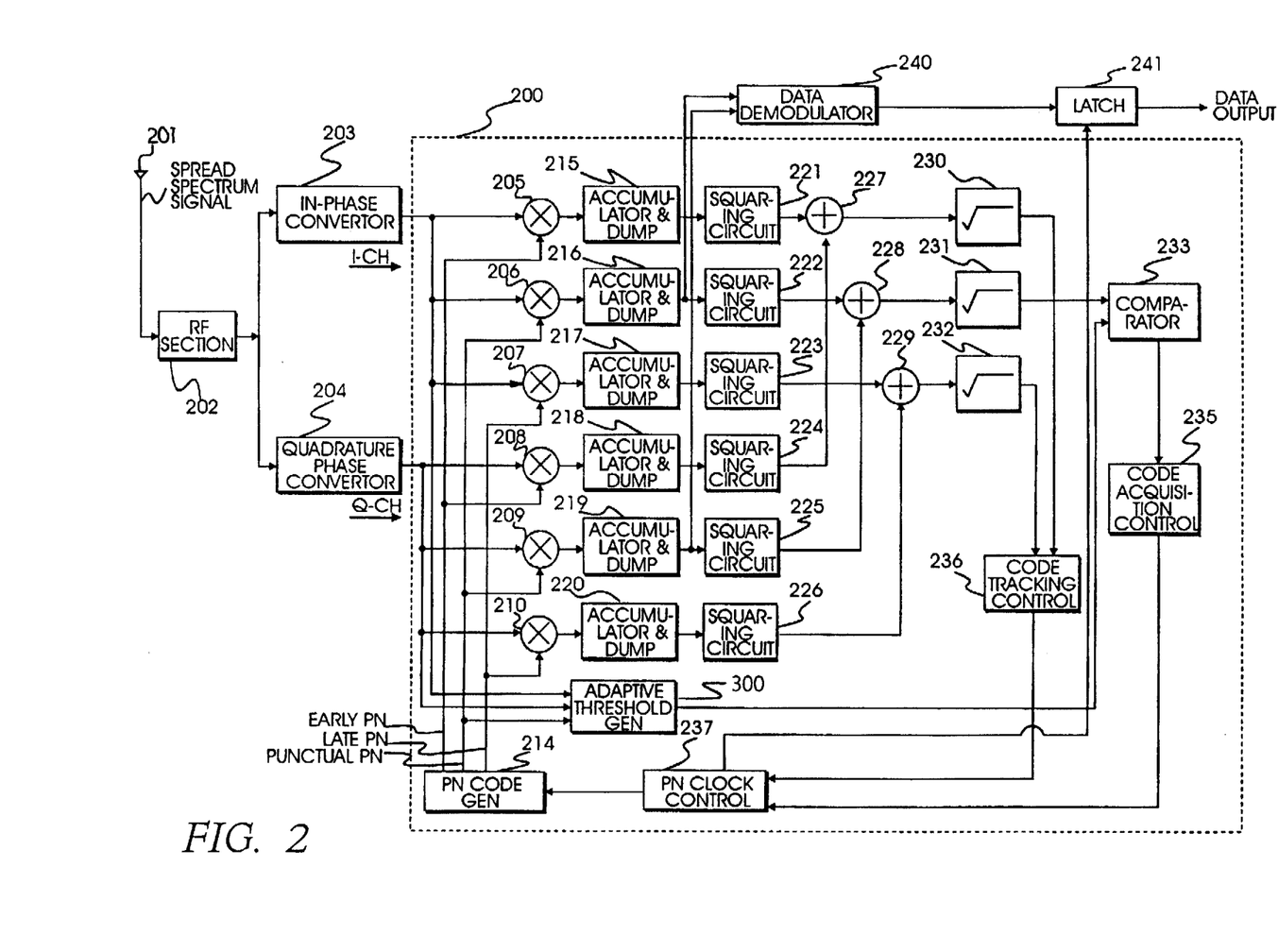
FIG. 2 is a block diagram showing the construction of a spread spectrum receiver including a novel pseudo noise code sync device using an adaptive threshold according to the present invention.

Accordingly, we have conceived and designed a novel pseudo noise code sync device 200 using an adaptive threshold so as to overcome the deficiencies noted in the above conventional pseudo noise code sync device 200. Such novel pseudo noise code sync device using an adaptive threshold according to the present invention is shown in FIG. 2 and employs substantially similar circuit elements of the conventional pseudo noise code sync device, except for the novel adaptive threshold generator circuit 300 designed to generate a variable threshold in accordance with the variance of the received spread spectrum signal so as to enable the pseudo noise code sync device to accurately establish initial synchronization between a received pseudo noise code modulated in the spread spectrum signal and the reference pseudo noise code and maintain the two codes in fine synchronism. As shown in FIG. 2, the receiver includes an RF section 202 for receiving the spread spectrum signal having a pseudo-noise code modulated therein via an antenna 201, an in-phase converter 203 and a quadrature-phase converter 204 for converting an intermediate-frequency signal into I-channel and Q-channel reception signals. The novel pseudo noise code sync device includes a pseudo noise code generator 214 which receives a pseudo noise clock and then generates early, punctual and late pseudo noise codes. First, second, and third despreaders 205, 206, 207 receive and multiply an I-channel reception signal by the early, punctual and late pseudo noise codes, respectively, so as to produce I-channel despread signals. Fourth, fifth, and sixth despreaders 208, 209, 210 receive and multiply a Q-channel reception signal by the early, punctual and late pseudo noise codes, respectively, so as to produce Q-channel despread signals. First, second, third, fourth, fifth, and sixth accumulator and dump circuits 215, 216, 217, 218, 219, 220 respectively receive the I-channel and Q-channel despread signals from the first to sixth despreaders 205 to 210, accumulate these signals for 1 symbol duration, and then dump the results. First, second, third, fourth, fifth, and sixth squaring circuits 221 to 226 respectively receive and square the output signals of the first to sixth accumulator and dump circuits 215 to 220.

A first adder 227 receives the output of the first squaring circuit 221 and the output of the fourth squaring circuit 224 and then adds these two signals. Similarly, a second adder 228 receives the output of the second squaring circuit 222 and the output of the fifth squaring circuit 225 and then adds these two signals, and a third adder 129 receives the output of the third squaring circuit 123 and the output of the sixth squaring circuit 126 and then adds these two signals. The first, second, and third square root circuits 230, 231, 232 receive the outputs of the first, second, and third adders 227, 228, 229 and then output the square root-operated early, punctual and late signals, respectively.

An adaptive threshold generator 300 receives the I-channel reception signal, the Q-channel reception signal and the punctual pseudo noise code, and takes the correlation between the punctual pseudo noise code and the I-channel and Q-channel reception signals, to generate an adaptive threshold in response thereto.

A comparator 233 compares the punctual signal of the second square root circuit 231 with the adaptive threshold, and if the punctual signal is less than the reference threshold, outputs a signal indicating that the initial synchronization has not been achieved. Thereafter, a code acquisition controller 235 receives the signal and determines that the initial synchronization has not been achieved, so as to produce a code detection control signal in response thereto. A code tracking controller 236 receives the early and late signals from the first and third square root circuits 230 and 232, compares these two signals and then generates a pseudo noise clock control signal for maintaining the initial synchronization of the reception signals and reference pseudo noise codes within 1 chip duration. A pseudo noise clock controller 237 receives the code detection control signal and the pseudo noise clock control signal and then generates the pseudo noise clock to be adjusted according to these two signals. The pseudo noise code generator 214 receives the pseudo noise clock and controls the speed of generating the reference pseudo noise code in response to the speed of the input clock.

If, on the other hand, the initial synchronization has been achieved, the code tracking controller 236 receives the early and late signals and determines that the received pseudo noise code is synchronized with the reference pseudo noise code within 1 chip. Then, the code tracking controller 236 synchronizes these two codes more accurately and performs a code tracking operation so as to maintain the synchronization of the received pseudo noise code and reference pseudo noise code within 1 chip. That is, if the early signal outputted from the first square root circuit 230 is greater than the late signal outputted from the third square root circuit 232, this means that the reference pseudo noise code is phase-delayed in comparison with the received pseudo noise code modulated in the spread spectrum signal. Therefore, the code tracking controller 236 controls the pseudo noise clock controller 237 to generate the pseudo noise clock fast in response thereto. Thereby, the reference pseudo noise code is generated fast so as to be synchronized with the reception signal. On the contrary, however, if the late signal is greater than the early signal, this means that the received pseudo noise code modulated in the spread spectrum signal is phase-delayed in comparison with the reference pseudo noise code. Therefore, the code tracking controller 136 controls the pseudo noise clock controller 237 to generate the pseudo noise clock late in response thereto. Thereby, the reference pseudo noise code is generated late so as to be synchronized with the reception signal.

Figure 3:
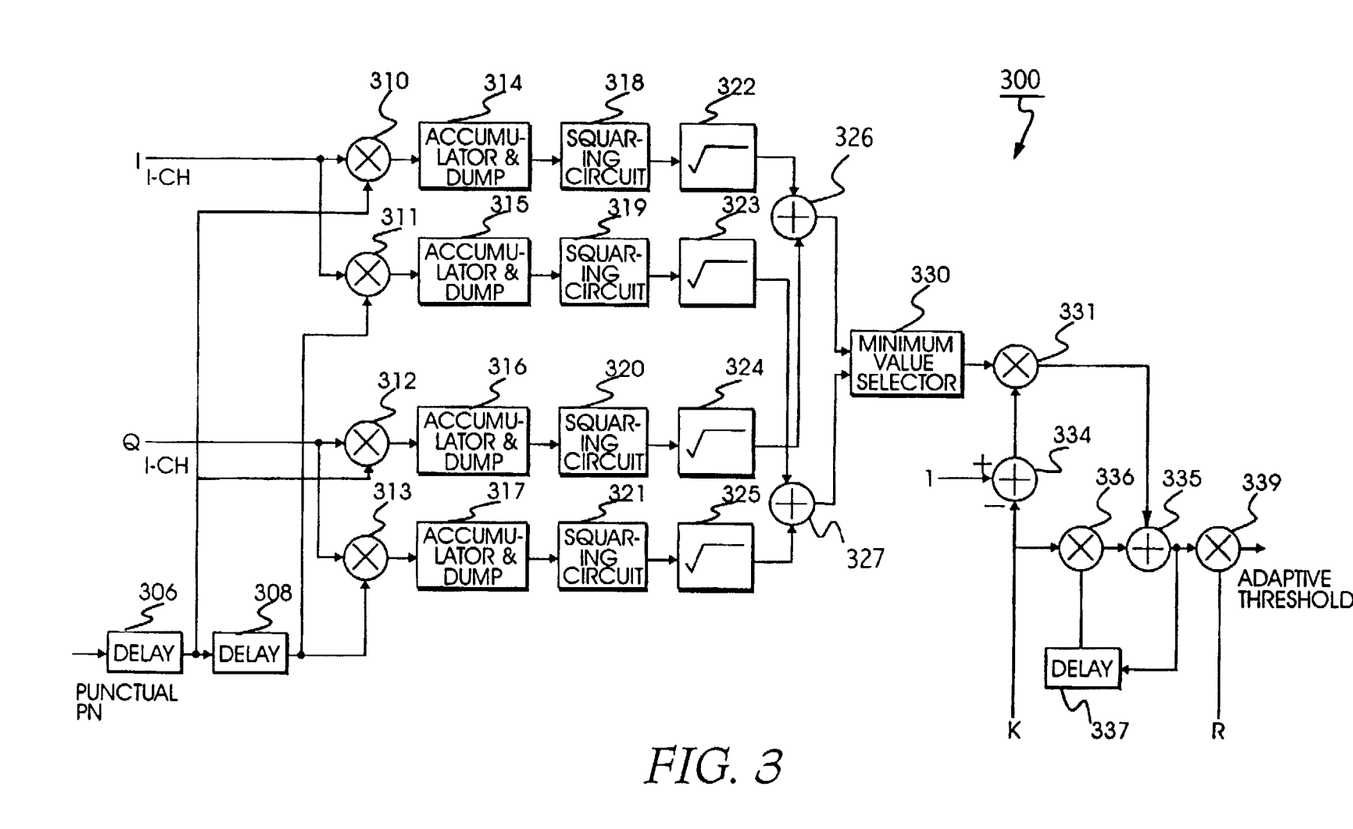
FIG. 3 is a detailed diagram showing the construction of an adaptive threshold generator of FIG. 2 according to the present invention.

FIG. 3 is a detailed diagram showing the construction of the adaptive threshold generator of FIG. 2. According to the invention, the novel adaptive threshold generator comprises a delay unit 306, 308 for phase-delaying the punctual pseudo noise code by $\pi$ and $2\pi$ to produce a two-chip delay pseudo noise code and a four-chip delay pseudo noise code, respectively; a correlator unit comprising a plurality of serially connected despreader 310, 311, 312, 313, accumulator and dump circuits 314, 315, 316, 317, squaring circuits 318, 319, 320, 321, square root circuits 322, 323, 324, 325, and adders 326, 327, for correlating the in-phase (I-channel) signal and the quadrature-phase (Q-channel) signal with the two-chip delay and the four-chip delay Pseudo noise signals to produce an early signal and a late signal; a minimum value selector 330 for selecting the less of the early and late signals to produce a minimum value; and an adaptive threshold operating unit comprising multipliers 331, 336, 339, adders 334, 335 and a delay 337, for generating the adaptive threshold based upon the minimum value and predetermined forgetting and weighting factors.

As shown in detail in FIG. 3, the first delay 306 receives the punctual pseudo noise code from the pseudo noise code generator 114 and outputs the pseudo noise code delayed by 2 chip durations. A second delay 308 receives and delays the punctual pseudo noise code outputted from the first delay 306 delayed by additional 2 chip durations.

A seventh despreader 310 multiplies the I-channel reception signal by the punctual pseudo noise code outputted from the first delay 306. An eighth despreader 311 multiplies the I-channel reception signal by the punctual pseudo noise code outputted from the second delay 308. A ninth despreader 312 multiplies the Q-channel reception signal by the punctual pseudo noise code outputted from the first delay 306. A tenth despreader 313 multiplies the Q-channel reception signal by the punctual pseudo noise code outputted from the second delay 308.

Seventh, eighth, ninth, and tenth accumulator and dump circuits 314, 315, 316, 317 respectively receive the output signals of the seventh, eighth, ninth, and tenth despreaders 310, 311, 312, 313, accumulate these signals for 1 symbol duration, and then dump the resultant signals.

Seventh, eighth, ninth, and tenth squaring circuits 318, 319, 320, 321 respectively receive the output signals of the seventh, eighth, ninth, and tenth accumulator and dump circuits 314, 315, 316, 317 and then square these signals, respectively. Seventh to tenth square root circuits 322 to 325 receive the output signals of the seventh to tenth squaring circuits 318 to 321 and then square root-operate these signals, respectively.

A first adder 326 receives the output signals of the seventh and ninth square root circuits 322 and 324 and then adds these two signals. A second adder 327 receives the output signals of the eighth and tenth square root circuits 323 and 325 and then adds these two signals. That is, the outputs of the seventh and ninth square root circuits 322 and 324, i.e., the results of the correlation between the and Q channel reception signals and the output of the first delay 306 are added at the first adder 326, to be the early signal, and the outputs of the eighth and tenth square root circuits 323 and 325, i.e., the results of the correlation between the I and Q channel reception signals and the output of the second delay 308 are added at the second adder 327, to be the late signal.

A minimum value selector 330 receives the output signals of the first and second adders 326 and 327 and then selects the less of these two signals. That is, assuming that the output of the first adder 326 is "E" and the output of the second adder 327 is "L", the minimum value selector 330 selects the minimum value (min(E,L)) of E and L.

Assuming that at the nth symbol, the output signal of the third adder 335 is y(n) and the adaptive threshold is THR(n), the output signal of the third adder 335 and the adaptive threshold may be indicated as follows:

$$y(n)=(1-k)\cdot min(E,L)+k\cdot y(n-1) \quad (4)$$

$$THR(n)=R\cdot y(n), \quad (5)$$

where min(E,L) is an operator for selecting the minimum value of E and L, and the forgetting factor k and weighting factor R may be a fixed value or a variable value.

A first subtracter 334 receives a predetermined factor 1 and a predetermined forgetting factor k and then outputs a subtraction value 1−k. A first multiplier 331 receives the output 1−k of the first subtracter 334 and the output of the minimum value selector 330 and then multiplies these two signals. A third adder 335 receives the output of a second multiplier 336 and the output of the first multiplier 331 and then adds these two signals. A third delay 337 delays the output signal of the third adder 335 by 1 chip duration. The second multiplier 336 receives the output signal of the third delay 337 and the forgetting factor k and then multiplies these two inputs. A third multiplier 339 receives a predetermined weighting factor R and the output signal of the third adder 335, multiplies these two inputs and then output a final adaptive threshold.

The forgetting factor k and weighting factor R can be varied according to different circumstance or can be used as a fixed value. In addition, the first and second delays 306 and 308 may be in a phase-delayed state by π at its minimum. However, in a preferred embodiment of the present invention, the first and second delays 306 and 308 each has a phase-delayed state by 2π. The third delay 337 may be in the phase-delayed state by π/2 at its minimum, however, in a preferred embodiment of the present invention, are in the phase-delayed state by π.

As described above, the present invention is capable of performing the pseudo noise code synchronization of the reception signal by obtaining the threshold which is adaptive to the variance of the reception signal using a predetermined weighting factor and forgetting factor, so as to prevent the false alarm or false tracking fail. Thereby, it is possible to enhance the performance of the code synchronization of the spread spectrum communication system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A spread spectrum receiver, comprising:

means for receiving a spread spectrum signal having a received pseudo-noise code modulated therein, and for generating an in-phase signal and a quadrature-phase signal;

a pseudo-noise code generator for generating a reference pseudo-noise code sequence comprising an early pseudo-noise code, a punctual pseudo-noise code, and a late pseudo-noise code in response to a pseudo-noise clock signal;

correlation means for correlating said in-phase signal and said quadrature-phase signal with said early pseudo-noise code, said punctual pseudo-noise code, and said late pseudo-noise code, respectively, to respectively generate an early correlation signal, a punctual correlation signal, and a late correlation signal;

an adaptive threshold generator for receiving said in-phase signal and said quadrature-phase signal to adaptively generate an adaptive threshold in response to said punctual pseudo-noise code;

pseudo-noise code acquisition means for comparing said punctual correlation signal with said adaptive threshold and establishing initial synchronization between said received pseudo-noise code modulated in said spread spectrum signal and said punctual pseudo-noise code;

pseudo-noise code tracking means for combining said early and late correlation signals to produce an error signal proportional to a phase difference between said received pseudo-noise code modulated in said spread spectrum signal and said punctual pseudo-noise code;

means, responsive to said pseudo-noise code acquisition means and said pseudo-noise code tracking means, for generating said pseudo-noise clock signal to control generation of said reference pseudo-noise code sequence and phase synchronization between said received pseudo-noise code modulated in said spread spectrum signal and said punctual pseudo-noise code; and a demodulator for demodulating said spread spectrum signal into a baseband signal.

2. The spread spectrum receiver of claim 1, wherein said correlation means comprises:

a first despreader for generating a first despread signal by multiplying said in-phase signal with said early pseudo-noise code;

a first accumulator and dump circuit for accumulating said first despread signal over a finite time interval to produce a first accumulated signal;

a first squaring circuit for squaring said first accumulated signal;

a second despreader for generating a second despread signal by multiplying said in-phase signal with said punctual pseudo-noise code;

a second accumulator and dump circuit for accumulating said second despread signal over a finite time interval to produce a second accumulated signal;

a second squaring circuit for squaring said second accumulated signal;

11 a third despreader for generating a third despread signal by multiplying said in-phase signal with said late pseudo-noise code;

a third accumulator and dump circuit for accumulating said third despread signal over a finite time interval to produce a third accumulated signal;

a third squaring circuit for squaring said third accumulated signal;

a fourth despreader for generating a fourth despread signal by multiplying said quadrature-phase signal with said early pseudo-noise code;

a fourth accumulator and dump circuit for accumulating said fourth despread signal over a finite time interval to produce a fourth accumulated signal;

a fourth squaring circuit for squaring said fourth accumulated signal;

a fifth despreader for generating a fifth despread signal by multiplying said quadrature-phase signal with said punctual pseudo-noise code;

a fifth accumulator and dump circuit for accumulating said fifth despread signal over a finite time interval to produce a fifth accumulated signal;

a fifth squaring circuit for squaring said fifth accumulated signal;

a sixth despreader tier generating a sixth despread signal by multiplying said quadrature-phase signal with said late pseudo-noise code;

a sixth accumulator and dump circuit for accumulating said sixth despread signal over a finite time interval to produce a sixth accumulated signal;

a sixth squaring circuit for squaring said sixth accumulated signal;

a first adder for providing a first added signal by adding the squares of said first and fourth accumulated signals;

a first square root circuit for generating said early correlation signal by providing a square root of said first added signal;

a second adder for providing a second added signal by adding the squares of said second and fifth accumulated signals;

a second square root circuit for generating said punctual correlation signal by providing a square root of said second added signal;

a third adder for providing a third added signal by adding the squares of said third and sixth accumulated signals; and a third square root circuit for generating said late correlation signal by providing a square root of said third added signal.

3. The spread spectrum receiver of claim 1, wherein said pseudo-noise code acquisition means comprises:

a comparator for making a comparison between said punctual correlation signal with said adaptive threshold; and a code acquisition controller for generating an initial synchronization signal indicating that said initial synchronization with said spread spectrum signal has been established in response to said comparison.

4. The spread spectrum receiver of claim 1, wherein said adaptive threshold generator comprises:

a delay unit for phase-delaying the punctual pseudo-noise code by $\pi$ and $2\pi$ to produce a two-chip delay pseudo-noise code and a four-chip delay pseudo-noise code, respectively;

a correlator unit for correlating the in-phase signal and the quadrature-phase signal with the two-chip delay and

12 the four-chip delay pseudo-noise codes to produce an early signal and a late signal;

a minimum value selector for selecting the less of the early and late signals to produce a minimum value; and an adaptive threshold operating unit for generating the adaptive threshold based upon the minimum value and predetermined forgetting and weighting factors.

5. The spread spectrum receiver of claim 1, wherein said adaptive threshold generator comprises:

a delay unit for phase-delaying the punctual pseudo-noise code by $\pi$ and $2\pi$ to produce a two-chip delay pseudo-noise code and a four-chip delay pseudo-noise code, respectively;

a first despreader for generating a first despread signal by multiplying said in-phase signal with said two-chip delay pseudo-noise code;

a first accumulator and dump circuit for accumulating said first despread signal over a finite time interval to produce a first accumulated signal;

a first squaring circuit for squaring said first accumulated signal;

a second despreader for generating a second despread signal by multiplying said in-phase signal with said four-chip delay pseudo-noise code;

a second accumulator and dump circuit for accumulating said second despread signal over a finite time interval to produce a second accumulated signal;

a second squaring circuit for squaring said second accumulated signal;

a third despreader for generating a third despread signal by multiplying said quadrature-phase signal with said two-chip delay pseudo-noise code;

a third accumulator and dump circuit for accumulating said third despread signal over a finite time interval to produce a third accumulated signal;

a third squaring circuit for squaring said third accumulated signal;

a fourth despreader for generating a fourth despread signal by multiplying said quadrature-phase signal with said four-chip delay pseudo-noise code;

a fourth accumulator and dump circuit for accumulating said fourth despread signal over a finite time interval to produce a fourth accumulated signal;

a fourth squaring circuit for squaring said fourth accumulated signal;

a first adder for generating a first added signal by combining the squares and the subsequent squared root values of said first and third accumulated signals;

a second adder for generating a second added signal by combining the squares and the subsequent squared root values of said second and fourth accumulated signals;

a minimum value selector for selecting the less of the first and second added signals to produce a minimum value;

a first multiplier for generating a first multiplied signal by multiplying said minimum value with a subtraction value of 1-k, where k represents a predetermined forgetting factor;

a second multiplier for generating a second multiplied signal by multiplying a delayed signal with said predetermined forgetting factor;

a third adder for combining said first multiplied signal and said second multiplied signal to produce said delayed signal; and a third multiplier for generating said adaptive threshold by multiplying said delayed signal by a predetermined weighting factor.

6. A receiver, comprising:

means for receiving a spread spectrum signal having a received pseudo-noise code sequence modulated therein, and for generating an in-phase signal and a quadrature-phase signal;

a pseudo-noise code generator for generating a reference pseudo-noise code sequence comprising an early pseudo-noise code, a punctual pseudo-noise code, and a late pseudo-noise code;

correlator means for correlating said in-phase signal and said quadrature-phase signal with said early pseudo-noise code, said punctual pseudo-noise code, and said late pseudo-noise code, respectively, to respectively generate an early correlation signal, a punctual correlation signal, and a late correlation signal, each comprising both in-phase and quadrature-phase components;

an adaptive threshold generator for receiving said in-phase signal and said quadrature-phase signal to adaptively generate a variable threshold in response to said punctual pseudo-noise code;

code acquisition means for comparing said punctual correlation signal with said variable threshold to produce an initial synchronization detection signal;

code tracking means for combining said early and late correlation signals to produce an error signal proportional to a phase difference between said received pseudo-noise code modulated in said spread spectrum signal and said reference pseudo-noise code sequence; and a demodulator for demodulating said spread spectrum signal into a baseband signal.

7. The receiver of claim 6, wherein said correlator means comprises:

a first despreader for generating a first despread signal by multiplying said in-phase signal with said early pseudo-noise code;

a first accumulator and dump circuit for accumulating said first despread signal over a finite time interval to produce a first accumulated signal;

a first squaring circuit for squaring said first accumulated signal;

a second despreader for generating a second despread signal by multiplying said in-phase signal with said punctual pseudo-noise code;

a second accumulator and dump circuit for accumulating said second despread signal over a finite time interval to produce a second accumulated signal;

a second squaring circuit for squaring said second accumulated signal;

a third despreader for generating a third despread signal by multiplying said in-phase signal with said late pseudo-noise code;

a third accumulator and dump circuit for accumulating said third despread signal over a finite time interval to produce a third accumulated signal;

a third squaring circuit for squaring said third accumulated signal;

a fourth despreader for generating a fourth despread signal by multiplying said quadrature-phase signal with said early pseudo-noise code;

a fourth accumulator and dump circuit for accumulating said fourth despread signal over a finite time interval to produce a fourth accumulated signal;

a fourth squaring circuit for squaring said fourth accumulated signal;

a fifth despreader for generating a fifth despread signal by multiplying said quadrature-phase signal with said punctual pseudo-noise code;

a fifth accumulator and dump circuit for accumulating said fifth despread signal over a finite time interval to produce a fifth accumulated signal;

a fifth squaring circuit for squaring said fifth accumulated signal;

a sixth despreader for generating a sixth despread signal by multiplying said quadrature-phase signal with said late pseudo-noise code;

a sixth accumulator and dump circuit for accumulating said sixth despread signal over a finite time interval to produce a sixth accumulated signal;

a sixth squaring circuit for squaring said sixth accumulated signal;

a first adder for providing a first added signal by adding the squares of said first and fourth accumulated signals;

a first square root circuit for generating said early correlation signal by providing a square root of said first added signal;

a second adder for providing a second added signal by adding the squares of said second and fifth accumulated signals;

a second square root circuit for generating said punctual correlation signal by providing a square root of said second added signal;

a third adder for providing a third added signal by adding the squares of said third and sixth accumulated signals; and a third square root circuit for generating said late correlation signal by providing a square root of said third added signal.

8. The receiver of claim 6, wherein said adaptive threshold generator comprises:

a delay unit for phase-delaying the punctual pseudo-noise code by $\pi$ and $2\pi$ to produce a two-chip delay pseudo-noise code and a four-chip delay pseudo-noise code, respectively;

a correlator unit for correlating the in-phase signal and the quadrature-phase signal with the two-chip delay and the four-chip delay pseudo-noise codes to produce an early signal and a late signal;

a minimum value selector for selecting the less of the early and late signals to produce a minimum value; and an adaptive threshold operating unit for generating said variable threshold based upon the minimum value and predetermined forgetting and weighting factors.

9. The receiver of claim 6, wherein said adaptive threshold generator comprises:

a delay unit for phase-delaying the punctual pseudo-noise code by $\pi$ and $2\pi$ to produce a two-chip delay pseudo-noise code and a four-chip delay pseudo-noise code, respectively;

a first despreader for generating a first despread signal by multiplying said in-phase signal with said two-chip delay pseudo-noise code;

a first accumulator and dump circuit for accumulating said first despread signal over a finite time interval to produce a first accumulated signal;

a first squaring circuit for squaring said first accumulated signal;

a second despreader for generating a second despread signal by multiplying said in-phase signal with said four-chip delay pseudo-noise code;

a second accumulator and dump circuit for accumulating said second despread signal over a finite time interval to produce a second accumulated signal;

a second squaring circuit for squaring said second accumulated signal;

a third despreader for generating a third despread signal by multiplying said quadrature-phase s signal with said two-chip delay pseudo-noise code;

a third accumulator and dump circuit for accumulating said third despread signal over a finite time interval to produce a third accumulated signal;

a third squaring circuit for squaring said third accumulated signal;

a fourth despreader for generating a fourth despread signal by multiplying said quadrature-phase signal with said four-chip delay pseudo-noise code;

a fourth accumulator and dump circuit for accumulating said fourth despread signal over a finite time interval to produce a fourth accumulated signal;

a fourth squaring circuit for squaring said fourth accumulated signal;

a first adder for generating a first added signal by combining the squares and the subsequent squared root values of said first and third accumulated signals;

a second adder for generating a second added signal by combining the squares and the subsequent squared root values of said second and fourth accumulated signals;

a minimum value selector for selecting the less of the first and second added signals to produce a minimum value;

a first multiplier for generating a first multiplied signal by multiplying said minimum value with a subtraction value of 1−k, where k represents a predetermined forgetting factor;

a second multiplier for generating a second multiplied signal by multiplying a delayed signal with said predetermined forgetting factor;

a third adder for combining said first multiplied signal and said second multiplied signal to produce said delayed signal; and a third multiplier for generating said variable threshold by multiplying said delayed signal by a predetermined weighting factor.

10. The receiver of claim 6, wherein said code acquisition means comprises:

a comparator for making a comparison between said punctual correlation signal with said variable threshold;

a synchronization detector for generating said initial synchronization detection signal indicating initial synchronization with said spread spectrum signal in response to said comparison.

11. The receiver of claim 6, wherein said early, punctual and late pseudo-noise codes are spaced-apart from each other in time by one chip interval.

12. A method using a spread spectrum receiver for demodulating a spread spectrum signal having a data signal modulated with a pseudo-noise code sequence, comprising the steps of:

receiving the spread spectrum signal and generating an in-phase signal and a quadrature-phase signal;

sampling repetitively said in-phase signal and said quadrature-phase signal at least twice a chip rate of said spread spectrum signal to generate a plurality of in-phase samples and a plurality of quadrature-phase samples, respectively;

generating a reference pseudo-noise code sequence comprising a first pseudo-noise code, a second pseudo-noise code, and a third pseudo-noise code in response to a pseudo-noise clock signal;

correlating noncoherently said plurality of in-phase samples with said first, second, and third pseudo-noise codes, respectively, to respectively generate first, second, and third in-phase correlation signals;

correlating noncoherently said plurality of quadrature-phase samples with said first, second, and third pseudo-noise codes, respectively, to respectively generate first, second, and third quadrature-phase correlation signals;

generating first, second, and third correlation signals in response to respective arithmetic operations of said first, second, and third in-phase and quadrature-phase correction signals;

adaptively generating a variable threshold based upon said in-phase signal and said quadrature-phase signal in accordance with said second pseudo-noise code;

generating an initial synchronization detection signal indicating that a received pseudo-noise code sequence modulated in said spread spectrum signal is in-phase with said reference pseudo-noise code sequence based upon a comparison between said second correlation signal and said variable threshold;

generating an error signal proportional to a phase difference between said received pseudo-noise code sequence modulated in said spread spectrum signal and said reference pseudo-noise code sequence by combining said first and third correlation signals;

generating said pseudo-noise clock signal to control generation of said reference pseudo-noise code sequence and establishment of synchronization between said received pseudo-noise code sequence modulated in said spread spectrum signal and said reference pseudo-noise code sequence based upon said initial synchronization detection signal and said error signal; and detecting noncoherently said second in-phase correlation signal and said second quadrature-phase correlation signal and demodulating said spread spectrum signal into a base-band signal.

13. The method of claim 12, wherein said first, second, and third pseudo-noise codes represent early, punctual and late pseudo-noise codes, respectively, said early, punctual, and late pseudo-noise codes are spaced-apart from each other in time by a one chip interval.

14. A method using a spread spectrum receiver for demodulating a spread spectrum signal having a data signal modulated with a pseudo-noise code sequence, comprising the steps of:

receiving said spread spectrum signal, and generating an in-phase channel spread baseband signal and a quadrature-phase channel spread baseband signal from said spread spectrum signal;

generating a reference pseudo-noise code sequence comprising an early pseudo-noise code, a punctual pseudo-noise code, and a late pseudo-noise code in response to a pseudo-noise clock signal;

correlating each of said in-phase channel spread baseband signal and said quadrature-phase channel spread baseband signal with each of said early, punctual, and late pseudo-noise codes, respectively, to generate early, punctual, and late correlation signals, respectively;

adaptively generating a variable threshold based upon said in-phase channel spread baseband signal and said quadrature-phase channel spread baseband signal in accordance with said punctual pseudo-noise code;

generating an initial synchronization detection signal indicating that a received pseudo-noise code sequence modulated in said spread spectrum signal is in-phase with said reference pseudo-noise code sequence based upon a comparison between said punctual correlation signal and said variable threshold;

generating an error signal proportional to a phase difference between said received pseudo-noise code sequence modulated in said spread spectrum signal and said reference pseudo-noise code sequence based upon a combination of said early and late correlation signals;

generating said pseudo-noise clock signal to control generation of said reference pseudo-noise code sequence and synchronization between said received pseudo-noise code sequence modulated in said spread spectrum signal and said reference pseudo-noise code sequence based upon said initial synchronization detection signal and said error signal; and performing a non-coherent detection of in-phase quadrature-phase channel components of said punctual correlation signal and demodulating said spread spectrum signal into a baseband signal.

15. A pseudo-noise code synchronization device using an adaptive threshold in a spread spectrum receiver, said pseudo-noise code synchronization device comprising:

pseudo-noise code generator means for generating first, second and third pseudo-noise codes in response to a pseudo-noise clock signal, said second pseudo-noise code being phase-delayed by $\pi/2$ with respect to said first pseudo-noise code, and said third pseudo-noise code being phase-delayed by $\pi/2$ with respect to said second pseudo-noise code;

first despread means for multiplying an in-phase channel reception signal and a quadrature-phase channel reception signal by said first, second and third pseudo-noise codes, respectively, to respectively generate first, second and third in-phase despread signals and first, second and third quadrature-phase despread signals;

first accumulator and dump means for accumulating said first, second and third in-phase and quadrature-phase despread signals for a predetermined symbol duration, respectively, to respectively generate first, second, and third in-phase accumulated signals and first, second, and third quadrature-phase accumulated signals;

first squaring means for squaring said first, second, and third in-phase and quadrature-phase accumulated signals respectively to respectively generate first, second, and third in-phase squared signals and first, second, and third quadrature-phase squared signals;

first adding means for adding said first in-phase squared signal to said first quadrature-phase squared signal, said second in-phase squared signal to said second quadrature-phase squared signal, and said third in-phase squared signal to said third quadrature-phase squared signal respectively, to respectively generate first, second, and third added signals;

first square root operating means for providing a square root of said first, second, and third added signals, respectively, to produce first, second, and third operation signals, respectively;

adaptive threshold generating means for taking correlations between said in-phase channel reception signal, said quadrature-phase reception signal and said second pseudo-noise code to produce said adaptive threshold;

comparing means for comparing said second operation signal with said adaptive threshold to produce a resultant signal;

code acquisition control means for receiving said resultant signal to produce a code detection control signal in response thereto;

code tracking control means for comparing said first and third operation signals to produce a pseudo-noise clock control signal for maintaining the initial synchronization of said in-phase and quadrature-phase channel reception signals and said first, second, and third pseudo-noise codes within a predetermined chip duration; and clock control means for receiving said code detection control signal and said pseudo-noise clock control signal to generate said pseudo-noise clock signal speed-controlled in response thereto.

16. The pseudo-noise code synchronization device of claim 15, wherein said adaptive threshold generating means comprises:

delay means for delaying said second pseudo-noise code to produce fourth and fifth pseudo-noise codes which are phase-delayed by $\pi$ and $2\pi$, respectively;

second despread means for despreading said in-phase channel reception signal, said quadrature-phase channel reception signal by said fourth and fifth pseudo noise codes to respectively produce fourth and fifth in-phase despread signals and fourth and fifth quadrature-phase despread signals;

second accumulator and dump means for accumulating said fourth and fifth in-phase and quadrature-phase despread signals for a predetermined symbol duration to respectively produce fourth and fifth in-phase accumulated signals and fourth and fifth quadrature-phase accumulated signals;

second squaring means for squaring said fourth and fifth in-phase and quadrature-phase accumulated signals to respectively produce fourth and fifth in-phase squared signals and fourth and fifth quadrature-phase squared signals;

second square root-operating means for providing a square root of said fourth and fifth in-phase and quadrature-phase squared signals to respectively produce fourth and fifth in-phase operation signals and fourth and fifth quadrature-phase operation signals;

second adding means for adding said fourth in-phase operation signal to said fourth quadrature-phase operation signal and said fifth in-phase operation signal to said fifth quadrature-phase operation signal respectively to respectively produce fourth and fifth added signals;

minimum value output means for selecting between said fourth and fifth added signals to produce a minimum value;

first adaptive threshold operating means for subtracting a predetermined forgetting factor from a fixed constant factor, multiplying said minimum value by a subtracted value to generate a first multiplied value, multiplying a final output value phase-delayed by $\pi/2$ by said predetermined forgetting factor to generate a second multiplied value, and then combining said first multiplied value to said second multiplied value to generate said final output value; and second adaptive threshold operating means for multiplying said final output value by a predetermined weight factor to generate said adaptive threshold.

17. The pseudo-noise code synchronization device of claim 16, wherein said first despread means comprises:

in-phase despread means for multiplying said in-phase channel reception signal by said first, second and third pseudo-noise codes, respectively, to respectively produce said first, second and third in-phase despread signals; and quadrature-phase despread means for multiplying said quadrature-phase channel reception signal by said first, second and third pseudo-noise codes, respectively, to respectively produce said first, second and third quadrature-phase despread signals.

18. The pseudo-noise code synchronization device of claim 15, wherein said adaptive threshold generating means comprises:

- a delay unit for phase-delaying the second pseudo-noise code by $\pi$ and $2\pi$ to produce fourth and fifth pseudo-noise codes, respectively;
- a correlator unit for correlating said in-phase channel reception signal and said quadrature-phase channel reception signal with said fourth and fifth pseudo-noise codes to respectively produce an early signal and a late signal;
- a minimum value selector for selecting the less of the early and late signals to produce a minimum value; and
- an adaptive threshold operating unit for generating said adaptive threshold based upon the minimum value and predetermined forgetting and weighting factors.

19. The pseudo-noise code synchronization device of claim 15, wherein said adaptive threshold generating means comprises:

- a delay unit for phase-delaying said second pseudo-noise code by $\pi$ and $2\pi$ to produce fourth and fifth pseudo-noise codes, respectively;
- a first despreader for generating a first despread signal by multiplying said in-phase channel reception signal with said fourth pseudo-noise code;
- a first accumulator and dump circuit for accumulating said first despread signal over a finite time interval to produce a first accumulated signal;
- a first squaring circuit for squaring said first accumulated signal;
- a second despreader for generating a second despread signal by multiplying said in-phase channel reception signal with said fifth pseudo-noise code;
- a second accumulator and dump circuit for accumulating said second despread signal over a finite time interval to produce a second accumulated signal;
- a second squaring circuit for squaring said second accumulated signal;
- a third despreader for generating a third despread signal by multiplying said quadrature-phase channel reception signal with said fourth pseudo-noise code;
- a third accumulator and dump circuit for accumulating said third despread signal over a finite time interval to produce a third accumulated signal;
- a third squaring circuit for squaring said third accumulated signal;
- a fourth despreader for generating a fourth despread signal by multiplying said quadrature-phase channel reception signal with said fifth pseudo-noise code;
- a fourth accumulator and dump circuit for accumulating said fourth despread signal over a finite time interval to produce a fourth accumulated signal;
- a fourth squaring circuit for squaring said fourth accumulated signal;
- a first adder for combining the squares and the subsequent squared root values of said first and third accumulated signals;
- a second adder for combining the squares and the subsequent squared root values of said second and fourth accumulated signals;
- a minimum value selector for selecting the less of the two outputs of said first and second adders to produce a minimum value;
- a first multiplier for generating a first multiplied signal by multiplying said minimum value with a subtraction value of 1-k, where k represents a predetermined forgetting factor;
- a second multiplier for generating a second multiplied signal by multiplying a delayed signal with said predetermined forgetting factor;
- a third adder for combining said first multiplied signal and said second multiplied signal to produce said delayed signal; and
- a third multiplier for generating said adaptive threshold by multiplying said delayed signal by a predetermined weighting factor.

20. The pseudo-noise code synchronization device of claim 19, wherein said $\pi$ and $2\pi$ represent a two-chip delay duration and a four-chip duration respectively.

21. A spread spectrum receiver, comprising:

- means for receiving a spread spectrum signal having a received pseudo-noise code modulated therein, and for generating an in-phase signal and a quadrature-phase signal therefrom;
- a pseudo-noise code generator for generating a reference pseudo-noise code sequence comprising early, punctual, and late successive pseudo-noise codes in dependence upon a pseudo-noise clock control signal;
- means for correlating said in-phase signal and said quadrature-phase signal with each of said early, punctual, and late successive pseudo-noise codes, respectively, and for respectively generating an early correlation signal, a punctual correlation signal, and a late correlation signal;
- an adaptive threshold generator for responding to said in-phase signal and said quadrature-phase signal in reference to said punctual pseudo-noise code to generate an adaptive threshold;
- means for combining said early and late correlation signals and thereby generating an error code representing a phase difference between said received pseudo-noise code modulated in said spread spectrum signal and said punctual pseudo-noise code, and for making a comparison between said punctual correlation signal and said adaptive threshold and generating on a basis of said comparison an acquisition code representing whether initial phase synchronization between said received pseudo-noise code modulated in said spread spectrum signal and said punctual pseudo-noise code has been achieved;
- means, responsive to said error code and said acquisition code, for generating said pseudo-noise clock signal to control generation of said reference pseudo-noise code sequence and phase synchronization between said received pseudo-noise code modulated in said spread spectrum signal and said punctual pseudo-noise code; and
- means for demodulating said spread spectrum signal into a baseband signal.

22. The spread spectrum receiver of claim 21, wherein said error code and said acquisition code generating means comprises:

- code tracking means for tracking said received pseudo-nose code modulated in said spread spectrum signal by combining said early and late correlation signals to generate said error code;
- comparator means for making said comparison between said punctual correlation signal with said adaptive threshold; and
- code acquisition means for generating said acquisition code indicating that said initial phase synchronization between said spread spectrum signal and said punctual pseudo-noise code has been achieved in response to said comparison between said punctual correlation signal and said adaptive threshold.

23. The spread spectrum receiver of claim 21, wherein said adaptive threshold generator comprises:

delay means for phase-delaying the punctual pseudo-noise code by $\pi$ and $2\pi$, respectively, to respectively generate a first delayed pseudo-noise code and a second delayed pseudo-noise code;

correlator means for correlating the in-phase signal and the quadrature-phase signal with said first delayed and said second delayed pseudo-noise codes to respectively produce an early signal and a late signal;

minimum value selector means for selecting the lesser of the early and late signals to produce a minimum value; and adaptive threshold operating means for generating said adaptive threshold based upon said minimum value and predetermined forgetting and weighting factors.

24. The spread spectrum receiver as claimed in claim 21, wherein said adaptive threshold generator comprises:

delay means for delaying said punctual pseudo-noise code by $\pi$ and $2\pi$, respectively to respectively generate a first delayed pseudo-noise code and a second delayed pseudo-noise code;

despread means for despreading said in-phase signal by said first and second delayed pseudo-noise codes to produce first and second in-phase despread signals, and for despreading said quadrature-phase signal by said first and second delayed pseudo-noise codes to respectively produce first and second quadrature-phase despread signals;

accumulator and dump means for accumulating said first and second in-phase despread signals and said first and second quadrature-phase despread signals for a predetermined symbol duration;

means for squaring and then providing a square root of outputs of said accumulator and dump means to respectively produce first and second in-phase operation signals and first and second quadrature-phase operation signals;

first adder means for adding said first in-phase operation signal and said first quadrature-phase operation signal to produce a first added signal, and for adding said second in-phase operation signal and said second quadrature-phase operation signal to produce a second added signal;

minimum value output means for selecting the lesser of said first and second added signals to produce a minimum value;

first adaptive threshold operation means for subtracting a predetermined forgetting factor from a fixed constant factor, multiplying said minimum value by a subtracted value to generate a first multiplied value, multiplying a final output value phase-delayed by $\pi/2$ by said predetermined factor to obtain a second multiplied value, and then combining said first multiplied value to said second multiplied value to produce said final output value; and second adaptive threshold operation means for multiplying said final output value by a predetermined weight factor to produce said adaptive threshold.

25. The spread spectrum receiver of claim 21, wherein said adaptive threshold generator comprises:

delay means for delaying said punctual pseudo-noise code by $\pi$ and $2\pi$, respectively, to respectively generate a first delayed pseudo-noise code and a second delayed pseudo-noise code;

first despreading means for generating a first despread signal by multiplying said in-phase signal with said first delayed pseudo-noise code;

first accumulator and dump circuit means for accumulating said first despread signal over a finite time interval to produce a first accumulated signal;

second despreading means for generating a second despread signal by multiplying said inphase signal with said second delayed pseudo-noise code;

second accumulator and dump circuit means for accumulating said second despread signal over a finite time interval to produce a second accumulated signal;

third despreading means for generating a third despread signal by multiplying said quadrature-phase signal with said first delayed pseudo-noise code;

third accumulator and dump circuit means for accumulating said third despread signal over a finite time interval to produce a third accumulated signal;

fourth despreading means for generating a fourth despread signal by multiplying said quadrature-phase signal with said second delayed pseudo-noise code;

fourth accumulator and dump circuit means for accumulating said fourth despread signal over a finite time interval to produce a fourth accumulated signal;

means for squaring and then determining squared root values of each of said first, second, third, and fourth accumulated signals;

first adding means for combining squares and squared root values of said first and third accumulated signals to produce a first added value, and for combining square and squared root values of said second and fourth accumulated signals to produce a second added value;

a minimum value selector for selecting a lesser one of said first and second added values to produce a minimum value;

first multiplying means for generating a first multiplied signal by multiplying said minimum value with a subtraction value of 1-k, where k represents a predetermined forgetting factor;

second multiplying means for generating a second multiplied signal by multiplying a delayed signal with said predetermined forgetting factor;

second adding means for combining said first multiplied signal and said second multiplied signal to produce said delayed signal; and third multiplying means for generating said adaptive threshold by multiplying said delayed signal by a predetermined weighting factor.

* * * * *